United States Patent [19]
Vick

[11] 3,800,917
[45] Apr. 2, 1974

[54] WHEEL CHOCK
[76] Inventor: Merlin E. Vick, 4708 Salem Dr., Mesquite, Tex. 75149
[22] Filed: Aug. 28, 1972
[21] Appl. No.: 284,338

[52] U.S. Cl. ............................................... 188/32
[51] Int. Cl. .............................................. B60t 3/00
[58] Field of Search ............................. 188/4 R, 32

[56] References Cited
UNITED STATES PATENTS
| | | | |
|---|---|---|---|
| 3,661,229 | 5/1972 | Stonhaus | 188/32 |
| 3,289,794 | 12/1966 | Miles | 188/32 |
| 1,768,265 | 6/1930 | Nicholls | 188/32 |
| 3,297,111 | 1/1967 | Lisboa | 188/32 |

FOREIGN PATENTS OR APPLICATIONS
| | | | |
|---|---|---|---|
| 320,897 | 12/1902 | France | 188/32 |
| 310,185 | 4/1929 | Great Britain | 188/32 |

Primary Examiner—Duane A. Reger
Attorney, Agent, or Firm—Clegg and Cantrell

[57] ABSTRACT

There is disclosed an improved wheel chock in the form of a hollow wedge with a ribbed inclined tire gripping face and a base which is concave upwardly to form ground gripping rails whose contact area with the ground varies with the loading of the wedge.

2 Claims, 4 Drawing Figures

PATENTED APR 2 1974 3,800,917

WHEEL CHOCK

BACKGROUND OF THE INVENTION

This invention relates to wheel chocks for pneumatic tired vehicles. It is particularly concerned with a wheel chock of improved compactness and lightness, and one with increased safety and reliability as compared to wheel chocks of the kind employed in the past.

It is necessary or desirable to block the wheels of pneumatic tired vehicles under many circumstances. In the trucking field, trucks, trailers and tractors are normally chocked at depots, and on road shoulders during emergency situations, to prevent runaway of the vehicle. Aircraft are normally chocked when parked on airport aprons, and during run-up or warm-up of their engines. Even small vehicles such as automobiles or hand trucks are often chocked to prevent undesired rolling when the vehicle is unattended or being serviced.

Field expedients are widely employed for chocking purposes. Use is made of casually found pieces of lumber or masonry. Occasionally lumber is cut to a general wedge shape to serve as chocks. The holding power and reliability of such field expedients is very problematical. Specially designed chocks have been employed, especially in the trucking and aircraft fields, but these have been of less than satisfactory holding power and are relatively heavy and clumsy in use. The design of such specially constructed chocks has been such that the dimensions of the chock must be closely correlated with the size of the tire with which it is to be used, and as a consequence several different sizes of a given chock design must be manufactured and inventoried in order to market that chock for a full range of tire sizes. Such specifically constructed chocks are commonly made of steel, and this circumstance is objectionable in the aircraft field and in the fuel trucking field, where it is necessary to take great precautions to avoid the inadvertent creation of sparks.

SUMMARY OF THE INVENTION

In accordance with the present invention an improved wheel chock is provided which is compact, lightweight, and convenient to use. It is so configured and proportioned that its holding power is excellent, and one size of chock is suitable for use with substantially the full range of commonly encountered pneumatic tires, from small hand truck tires to large aircraft tires of the kind used on jet transports. The improved wheel chock of the present invention is a one piece, hollow wedge, preferably cast of a non-sparking metal such as aluminum, which wedge is generally right triangular in profile, and is provided with tire gripping ribs on its hypotenuse or tire gripping face, as well as road gripping rails on the base of the wedge. The rails run longitudinally on the base along its outer edges, and the base is slightly concave upwardly in shape so that the road gripping rails have a limited area of contact with the road, thus assuring high gripping pressure between the wedge and the road. This construction insures that the road gripping area will be small, and hence the pressure will be high, when the chock is lightly loaded, and that the road gripping area will increase somewhat up to a limit as the loading on the wedge is increased. The tire gripping ribs on the tire engaging face of the wheel chock are shaped and positioned so that the force applied by a tire to the chock tends to hold the chock in rolling-blocking position more securely. This arrangement serves to increase the holding power of the chock and its reliability.

From the foregoing, it can be seen that it is an object of the present invention to provide an improved wheel chock for pneumatic tire vehicles of increased holding power, safety, reliability and convenience.

The foregoing object, together with other objects and purposes, can be better understood by consideration of the detailed description which follows, together with the accompanying drawings.

DESCRIPTION OF THE PREFERRED EMBODIMENT

Figure 1:
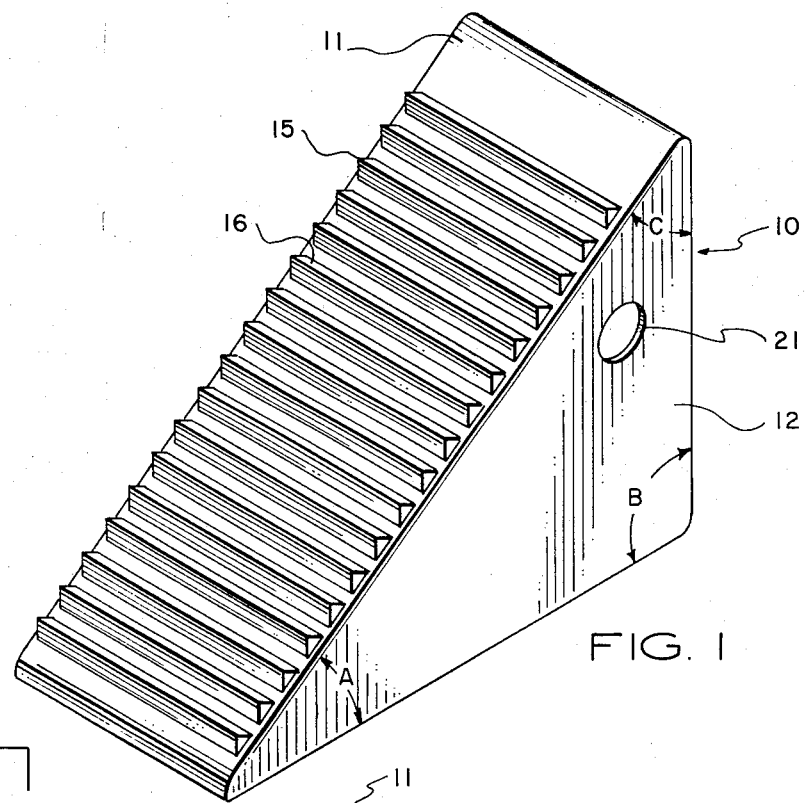
FIG. 1 is an isometric view of an improved wheel chock in accordance with the present invention.

The improved wheel chock of the present invention is designated generally as 10 in FIG. 1. From FIG. 1 it can be seen that chock 10 is a wedge which is generally right triangular in profile. The wedge 10 has an inclined tire engaging face 11, and side walls 12. As shown best in FIGS. 2 and 3, it has an upright back wall 13, and as appears in FIGS. 3 and 4, a base 14.

In its most preferred form the wedge 10 is generally right triangular in profile, and is a triangle of the 3–4–5 type. As a consequence, the angle between tire engaging face 11 and base 14 (indicated as angle A) is about 36.9°, while angle B between back wall 13 and base 14 is a right angle and angle C between tire gripping face 11 and back wall 13 is about 53.1°. It is preferred that the angle A be between about 30° and about 40°. It is also preferred that the dimensions of the wedge be about 6 inches ×8 inches ×10 inches. I have found that with the wedge proportioned and dimensioned as just described, it has excellent holding power for substantially all of the commonly encountered sizes of tires, from the small pneumatic tires employed on wheelbarrows, hand trucks and very light aircraft, up through and including the large tires employed on tractor trailers, and large transport aircraft. When the angle A is smaller than just described, the pneumatic tires can too readily roll up and over the inclined face 11 unless the wedge is made inordinately long. On the other hand, if the angle A is greater than that just described, the pneumatic tires tend to more readily push the wedge along the ground.

Figure 3:
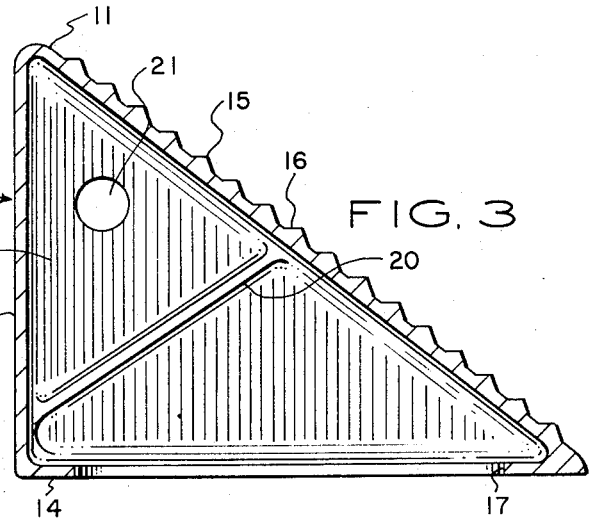
FIG. 3 is a sectional elevational view of the wheel chock shown in FIG. 2, the section being taken along the line 3—3 of FIG. 2.
Figure 4:
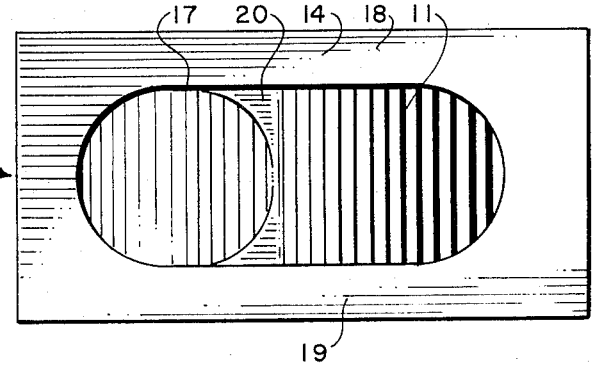
FIG. 4 is a bottom view of the wheel chock of FIGS. 2 and 3.

Tire engaging face 11 is provided with a plurality of tire gripping ribs 15, which, in a chock of the dimensions given in the discussion above, preferably extend above the surface of face 11 about one-fourth inch and are provided in the number of about 17, the spacing being about one-half inch. Ribs 15 extend laterally across face 11 and have an angularity of about 90°. It is preferred that the upper faces 16 of the ribs be angled slightly downwardly toward the back wall 15 of the wedge so that when the surface of a tire is in engagement with a rib 15 it applies a component of force downwardly and somewhat to the right as FIG. 3 is drawn. This force component tends to "seat" the wedge against the tire in blocking position. It is preferred that the ribs 15 be so distributed on face 11 that even a small tire will engage one or more of them readily. For this reason at least some of the ribs should be located near the foot of inclined face 11.

Figure 2:
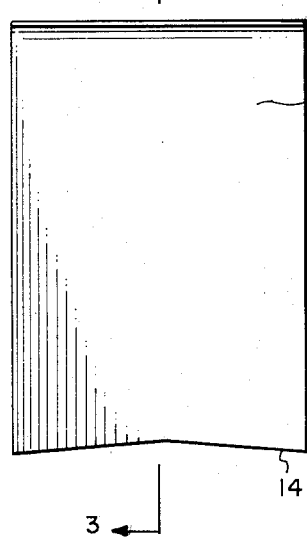
FIG. 2 is a rear elevational view of the wheel chock of FIG. 1.

As can best be seen in FIG. 2, the base 14 is slightly concave upwardly when viewed from the back of the wedge. The term "concave" is used herein in a broad descriptive sense, because convenience in manufacturing makes it desirable that the bottom surface actually be formed of two planar sections which form a very small angle with each other, rather than a true curved surface as the term concave in a more limited sense might connote. Base 14 is also provided with an opening 17 therein. Opening 17 extends longitudinally over the base as can best be seen in FIG. 4. This construction, together with the concave shape of the base, results in the formation of two rails indicated at 18 and 19 on FIG. 4 for gripping the ground. The rails extend longitudinally over the base and are of variable ground gripping area.

When a pneumatic tire is lightly loading the wedge 10, only the outer edges of rails 18 and 19 are in contact with the ground or road surface. The area of contact is very small, and the contact pressure is correspondingly very high, resulting in a good gripping action. As the loading by the tire on the wedge increases, the wedge will tend to be forced into the ground or road surface farther and more of the area of rails 18 and 19 will contact the ground or road surface. Such increased area will tend to reduce the contact pressure somewhat, which, in turn reduces the danger that the road surface will be unduly damaged. As the loading on the wedge by a tire is still further increased, substantially all of the surface of rails 18 and 19, and the intermediate areas of the surface of the base at each end of opening 17 will also come into contact with the ground or road surface. At such point, the area available for distribution of the load on the ground is exhausted, and further increases in loading by a tire result in increased gripping pressure between the base and the road. It can be seen, therefore, that in accordance with the present invention, excellent road gripping qualities are provided throughout the range of loading of the wedge, particularly in the light loading end of the range.

The triangular structure of the chock of the present invention is inherently strong. As was pointed out above, it is preferred that the wedge be hollow in order to save on construction materials and on weight. In order to enhance the strength of the wedge notwithstanding its hollow construction, a rib 20 is formed in the interior of the wedge. Rib 20 runs between tire engaging face 11 and back wall 13. It is so positioned that it intercepts back wall 13 near the bottom thereof and the tire engaging face 11 at a point near the middle thereof. Rib 20 thus protects the wedge 10 against crushing under extremely heavy loads. An aluminum chock having the preferred dimensions discussed above has, under test conditions, withstood a loading of some 26 tons without damage and has withstood a loading of 30 tons (the maximum which the test equipment could develop) without being broken into pieces or crushed so that it was inoperative.

As has been mentioned, the preferred material of construction for the wedge is cast aluminum which will not spark when struck or dragged against the road or vehicle. Wedge 10 can conveniently be case in one piece, and the absence of mechanical fastenings which can break or loosen increases the reliability of the device. Side walls 12 are provided with a hole or opening 21 through which chains may be threaded for carrying the wedge or through which a hook may be engaged for the same purpose. In addition hole 21 is of convenience to the user when he is positioning or removing the chock.

From the foregoing it can be seen that in accordance with the present invention, an improved wheel chock of superior performance is provided.

What is claimed is:

1. A wheel chock for pneumatic-tired vehicles comprising:
   a hollow wedge having a base;
   an inclined tire engaging free;
   and an upright back wall;
   said wedge being generally right-triangular in profile, the angle between said inclined tire engaging face and said base being between about 30° and about 40°;
   said tire engaging face being provided with tire gripping ribs extending horizontally across said face and projecting upwardly therefrom, the surface of each of said ribs including an area angled downwardly toward said back wall;
   said base having an opening therein extending longitudinally thereof and defining with the outer edges of said base a pair of ground gripping rails;
   and said base further being concave upwardly for limiting the area of contact thereof with the ground.

2. A wheel clock in accordance with claim 1 in which said wedge further includes an internal reinforcing rib extending between said back wall and said tire engaging face.

* * * * *